United States Patent [19]

Yokoyama et al.

[11] E Patent Number: Re. 33,325

[45] Reissued Date of Patent: Sep. 4, 1990

[54] REMOTELY CONTROLLABLE CIRCUIT BREAKER

[75] Inventors: Yoichi Yokoyama, Itami; Hideya Kondo, Yahata, both of Japan

[73] Assignee: Matsushita Electric Works, Ltd., Japan

[21] Appl. No.: 35,485

[22] Filed: Apr. 7, 1987

Related U.S. Patent Documents

Reissue of:

[64] Patent No.: 4,604,596
Issued: Aug. 5, 1986
Appl. No.: 772,912
Filed: Sep. 5, 1985

[30] Foreign Application Priority Data

Feb. 1, 1985 [JP] Japan ..... 60-18942
Jul. 12, 1985 [JP] Japan ..... 60-154455
Jul. 24, 1985 [JP] Japan ..... 60-163634

[51] Int. Cl.[5] ..... H01H 75/00

[52] U.S. Cl. ..... 335/14; 335/6; 335/16; 335/20

[58] Field of Search ..... 335/14, 6, 20, 16, 26

[56] References Cited

U.S. PATENT DOCUMENTS

| | | | |
|---|---|---|---|
| 2,552,427 | 5/1951 | Heidmann | 335/76 |
| 2,567,018 | 9/1951 | Grob | 335/70 |
| 2,671,141 | 3/1954 | Weinfurt | 335/74 |
| 2,693,513 | 11/1954 | Cellerini et al. | 335/74 |
| 2,693,516 | 11/1954 | Drobney et al. | 335/36 |
| 3,171,921 | 3/1965 | Woods | 335/52 |
| 3,171,928 | 3/1965 | Powell | 335/73 |
| 3,183,325 | 5/1965 | Norden | 337/79 |
| 3,193,643 | 7/1965 | Hollyday | 335/26 |
| 3,263,051 | 7/1966 | Gauthier et al. | 200/251 |
| 3,718,875 | 2/1973 | Kussy et al. | 335/18 |
| 3,755,766 | 8/1973 | Read, Jr. | 335/229 |
| 4,164,719 | 8/1979 | Young et al. | 335/14 |
| 4,167,716 | 9/1979 | Horn . | |
| 4,178,572 | 12/1979 | Gaskill et al. . | |
| 4,223,288 | 9/1980 | Stiner | 335/20 |
| 4,292,612 | 9/1981 | Howell . | |
| 4,308,511 | 12/1981 | Borona | 335/14 |
| 4,449,055 | 5/1984 | Greer et al. | 307/38 |
| 4,456,832 | 6/1984 | Greer et al. | 307/38 |
| 4,598,263 | 7/1986 | Heyne et al. | 335/14 |

FOREIGN PATENT DOCUMENTS

| | | |
|---|---|---|
| 2928823 | 2/1980 | Fed. Rep. of Germany . |
| 3001077 | 7/1980 | Fed. Rep. of Germany . |
| 3539976 | 5/1986 | Fed. Rep. of Germany . |
| 3611338 | 10/1986 | Fed. Rep. of Germany . |
| 44-27782 | 11/1969 | Japan . |
| 45-1692 | 1/1970 | Japan . |
| 45-29811 | 11/1970 | Japan . |
| 46-26901 | 9/1971 | Japan . |
| 48-38379 | 11/1973 | Japan . |
| 49-58366 | 6/1974 | Japan . |
| 50-30061 | 3/1975 | Japan . |
| 61-121231 | 6/1986 | Japan . |

*Primary Examiner*—E. A. Goldberg
*Assistant Examiner*—Lincoln Donovan
*Attorney, Agent, or Firm*—Stevens, Davis, Miller & Mosher

[57] ABSTRACT

An improved remotely controllable circuit breaker comprises a manually operable switching mechanism for opening and closing a single set of first and second contacts, a trip mechanism for opening the contacts upon occurrence of predetermined overload current conditions, and a remotely controllable switching mechanism for selectively opening and closing the contacts in response to a control signal remote from the breaker. The manually operable switching mechanism includes a movable contact arm carrying the first contact to be brought into and out of contacting engagement with the second contact by manipulation of a manual handle. The second contact is operatively connected to the remotely controllable switching mechanism to be driven thereby for movement between an operative position where the second contact is engageable with the first contact and an inoperative position where it is prohibited from being engaged with the first contact independently of the position of the first contact. Accordingly, the remotely controllable mechanism can be entirely isolated from the manually operable switching mechanism when the former is responsive to the remote control signal for bringing the second contact into its inoperative position.

10 Claims, 13 Drawing Sheets

REMOTELY CONTROLLABLE CIRCUIT BREAKER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a remotely controllable circuit breaker, and more particularly a remote controllable circuit breaker with a single set of breaker contacts which are forcibly opened and closed by a control signal remote from the circuit breaker independently of switching action by a manual handle of the breaker.

2. Description of the Prior Art

Circuit breakers of the above type which permit an remote control operation of opening the breaker contact are known in the art. Such a circuit breaker, for example, is described in U.S. Pat. No. 4,223,288. The circuit breaker utilizes a remotely controlled solenoid which, in response to a control signal from a location remote from the circuit breaker, actuates a movable contact arm carrying a movable contact away from a cooperative stationary contact for separation of the breaker contacts. The movable contact arm is operatively connected to a manually operated handle and an over-center tension spring to constitute a manually operable switching mechanism which, by the manipulation of the handle, is articulated with an over-center spring action between its ON position of closing the contacts and OFF position of opening the contacts. Said remotely controlled solenoid has an armature in abuttable engagement with the movable contact arm so that, when the solenoid is energized responsive to the remote control signal, the armature pushes the movable contact arm in the direction of disengaging the movable contact from the stationary contact against the biasing force of the over-center action spring. In this sense, the solenoid is to be additionally included or linked into the manually operable mechanism so as to add to complexity thereof and consequently render the fabrication thereof rather complicated.

In the meanwhile, it is quite possible that a consumer not knowing of the load interruption by such remote control signal tries in confusion, to uselessly manipulate the manual handle in an attempt to restore the load in series with the breaker. Such manipulation of the handle will naturally involve the movement of the movable contact arm between its ON condition and OFF condition with the over-center action of the spring included in the manually operable switching mechanism. Accordingly, with the above arrangement of actuating the movable contact arm linked to the handle and spring for separation of the breaker contacts by the remotely controlled solenoid, the solenoid cannot avoid being struck by the movable contact arm in its forward stroke from the OFF condition to ON condition due to the above handle manipulation by the unknowing consumer. With this result, the solenoid will suffer from the hammering action by the movable contact arm which action may damage the solenoid or cause the armature of the solenoid to bounce from its position of forcibly opening the breaker contacts into the position of momentarily closing the contacts, thus failing to stably keep the breaker contacts opened and rendering the operation of the remote controlled solenoid less reliable. To this end, the above prior circuit breaker has to include a separate latch means which is combined with the solenoid for mechanically holding the solenoid armature in the fixed position of opening the breaker contact so as not to be affected by the above hammering action, which further complicates the construction of the circuit breaker.

SUMMARY OF THE INVENTION

The present invention has been made in view of the above problems and therefore provide an improved circuit breaker in which a remotely controllable mechanism when actuated responsive to a remote control signal for separation of the breaker contacts can be entirely isolated from a manually operable switching mechanism including a manual handle and a movable contact arm such that the former mechanism will be free from an accidental manipulation of the latter mechanism by a unknowing consumer, ensuring reliable operation of maintaining the breaker contacts to be opened due to the remote control signal. The remotely controllable circuit breaker in accordance with the present invention has a single set of first and second breaker contacts and a manually operable switching mechanism for manually opening and closing the breaker contacts, which mechanism includes the manual handle and the movable contact arm carrying the first contact to be movable between the ON condition and OFF condition for bringing the first contact into and the out of contacting engagement with the second contact in response to the manipulation of the handle. A trip mechanism is operatively connected to the manually operable switching mechanism so as to open the breaker contacts upon the occurrence of a predetermined fault currents flowing through the breaker. The remotely controllable switching mechanism is included in the circuit breaker to open and close the breaker contacts in response to a remote control signal independently of the operation of the manual switching mechanism. An important novel feature of the present invention resides in the fact that the second contact is movable between an operative position where it is in contacting engagement with the first contact of the movable contact arm in its ON condition and an inoperative position where it is kept away from the first contact independently of the condition of the movable contact arm to disable the contact closing, and in that said second contact is operatively connected to said remotely controllable switching mechanism in such a way as to be moved between the operative and inoperative position by the latter receiving the remote control signal. Thus, the remotely controllable switching mechanism is operatively connected only to the second movable contact and not to the manually operable switching mechanism including the movable contact arm and the manual handle, such that the former mechanism will be kept free from being influenced by the action of latter mechanism which may be likely to be actuated by a consumer not knowing of the remote control responsive interruption of a selected load in series with the circuit breaker in the event of that interruption. With this result, the remotely controllable switching mechanism can be protected from being influenced by the accidental actuation of the manually operable switching mechanism so that it will not be damaged thereby and that it can keep the breaker contacts opened or closed in a reliable manner without resorting to any special guard means protecting the remotely controllable switching mechanism against the above accidental actuation of the manual switching mechanism during the remote control signal responsive interruption of the breaker.

Accordingly, it is a primary object of the present invention to provide a remotely controllable circuit breaker which is reliable in operation and simple in construction.

In preferred embodiments, said remotely controllable switching mechanism comprises a polarized electromagnet having an armature operatively connected to said second contact for movement thereof between its operative and inoperative positions. The permanent magnet means attracts the armature in the direction of moving the second contact to the operative position of enabling the contact opening and closing by the manual switching mechanism. Upon energization of the electromagnet in response to the remote control signal, the armature is magnetized to have a magnet flux which opposes and overpowers the flux emanating the permanent magnet means, so that the armature is operated to move the second contact into the inoperative position. Thus, with the use of the polarized electromagnet as the remotely controllable switching mechanism for contact separation, the circuit breaker of the present invention can enjoy the benefit of polarized construction such as being operated at a lesser power requirement for remote control signal responsive separation of the contacts as compared to the general electromagnet construction without the permanent magnet, and providing higher response sensitivity.

It is therefore another object of the present invention to provide a remotely controllable circuit breaker operable at a lesser power requirement with higher response sensitivity.

In addition, the above polarized electromagnet is designed to stably hold the armature and therefor the second contact in either or both of its operative and inoperative positions, i.e., to have monostable operation or bistable operation. In one or more embodiments, the monostable operation is given to the polarized electromagnet such that the second contact is only stable at either of its operative or inoperative position, whereby the second contact is attracted upon deenergization of the electromagnet toward one of its positions selected depending upon an intended use of the circuit breaker. In other embodiments, the polarized electromagnet has bistable operation to hold the second contact both at the operative and inoperative positions upon deenergization of the electromagnet so that the second contact is kept at its positions without requiring continued energization of the electromagnet.

In the present invention, a novel and useful construction of the polarized electromagnet is disclosed to be effective in obtaining a compact arrangement as well as in reducing the leakage of the magnetic flux from the permanent magnet to thereby increase operation efficiency. The novel electromagnet construction comprises an axially movable armature to be connected to the second contact for movement thereof, a winding surrounding the armature, first and second U-shaped yokes mounted against the opposite sides of the winding with the central portion of each yoke in parallel relation with the length of the armature, and the permanent magnet means disposed between the center portions of the first and second yokes to polarize them in opposite polarity. The legs of the first yoke are located at positions axially outwardly of the armature ends to define individual outer pole members, while the legs of the second yoke are at positions axially inwardly of the outer pole members but outwardly of the ends of the winding to define individual inner pole members each of which is cooperative with the adjacent outer pole member to define an air gap within which the axial end of the armature is positioned so that the armature is axially movable in response to the excitation of the winding under the influence of the permanent magnet means. With this arrangement, the first and second yokes can be spaced laterally by a maximum distance within a minimum lateral dimension of the electromagnet assembly, thereby reducing the leakage or ineffective magnetic flux of the permanent magnet means acting between the center portions of the yokes while centralizing an effective magnetic flux between the axially aligned outer and inner pole members to assure an effective armature operation due to the flux of the permanent magnet means. The above electromagnet construction is particularly suitable for obtaining a bistable operation which allows the armature to be locked in both positions at each of which the armature has its axial ends in proximity to the outer and inner pole members to complete the magnetic circuit of the permanent magnet flux.

It is therefore a still further object of the present invention to provide a remotely controllable circuit breaker in which the remotely controllable switching mechanism is made of a polarized electromagnet of compact construction and efficient electromagnetic operation.

The above remotely controllable switching mechanism can be successfully combined with a manually operable switching mechanism of different types, one with an over-center action spring for effecting quick-break, quick-make contact operations and others with a spring-loaded linkage for effecting quick-break, delayed-make contact operations.

In preferred embodiments, the second contact is held on a contact carrier which has a first pivot axis for rotation thereabout and a second pivot axis connected to the output end of the remotely controllable mechanism so that the second contact when actuated by the latter moves along an arcuate path about the first axis into and out of contacting engagement with the first contact on the movable contact arm. This is advantageous in that an optimum travel or separation distance of the second contact from the first contact can be obtained with a limited movement of the output end of the remotely controllable switching mechanism.

It is therefore a further object of the present invention to provide a remotely controllable circuit breaker in which the travel distance of the second contact can be set at an optimum value with a limited amount of movement of the output end of the remotely controllable switching mechanism selected.

The present invention further discloses a unique and advantageous construction feature of an arc extinguishing chute to be incorporated into the circuit breaker. The arc chute includes an arc runner which is electrically connected to the second contact and is in a closely spaced relation to a contact plate carrying the second contact. The contact plate is arranged in generally parallel relation to the movable contact arm carrying the first contact in its closed or ON condition and passes the current therethrough toward the contacts in the opposite direction to the current passing in the movable contact arm so as to produce in the vicinity of the contact an electromagnet force which acts on a possible arc drawn between the contacts upon separation thereof to transfer one end of the arc from the second contact to the arc runner. Once this occurs, the arc proceeds along the arc runner as the movable contact arm moves toward its OFF condition and is finally guided into a stack of spaced metal plates to be extinguished thereat. With this result the arc drawn between the contacts can be readily transferred from the contacts and extended for enhancing the extinction of the arc and thus well protecting the contacts against the arc, which is therefore a further object of the present invention.

As an additional feature of the present invention, the circuit breaker is provided with an indicator which is responsive to the remote control signal to provide a visual indication of the actuation of the remotely controllable switching mechanism. Thus, a consumer looking at the side of the breaker can readily acknowledge the remote control signal responsive circuit opening or closing.

These and other objects and advantageous features of the present invention will be more apparent from the following detailed description of the preferred embodiments when taken in conjunction with the attached drawings.

DETAILED DESCRIPTION OF THE PREFERRED EMBODIMENTS

First embodiment <FIGS. 1 to 6>

Figure 1:
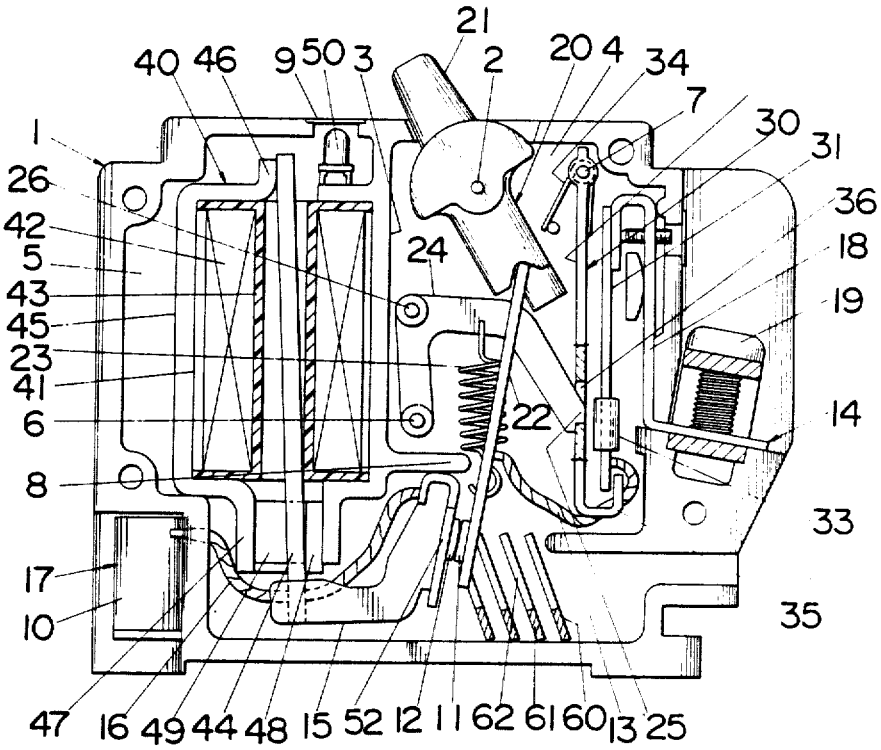
FIG. 1 is a side view, with an end cover removed, of a circuit breaker in accordance with a first preferred embodiment of the present invention and illustrating an ON condition in which its breaker contacts are closed.

A remotely controllable circuit breaker according to a first preferred embodiment of the present invention comprises a housing 1 of electrically insulative material in which a manually operable switching mechanism 20 is provided to manually open and close a single set of first and second breaker contacts 11 and 12 by manipulation of a manual handle 21 mounted on a handle pivot 2 of the housing 1 for pivotal movement thereabout. The housing 1 includes a side cover (not shown) and is separated by a partition rib 3 laterally into two-compartments 4 and 5, one for receiving the manually operable switching mechanism 20 and a trip mechanism 30 which opens the contacts 11 and 12 upon occurrence of predetermined overload current conditions and the other for receiving a remotely controllable switching mechanism 40 which is responsive to a remote control signal fed from a location remote from the breaker for opening the contacts, such remote control responsive contact opening operation overriding the manual switching operation to forcibly open the contacts 11 and 12.

Figure 3:
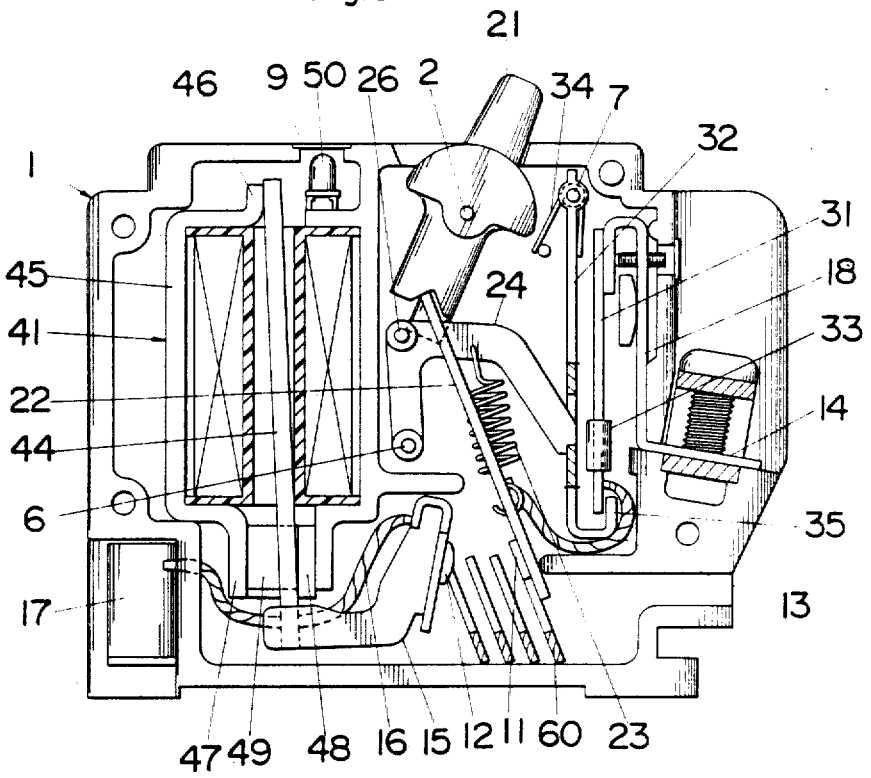
FIG. 3 is a side view of the above circuit breaker illustrating an OFF condition in which the breaker contacts are opened by the manipulation of the handle.

Said manually operable switching mechanism 20 is of conventional arrangement including the manual handle 21, a movable contact arm 22 carrying the first contact 11, and an over-center action spring 23 which effects the closing and opening of the contacts in quick-make, quick-break fashion. The first contact 11 is electrically connected through the movable contact arm 22, a braid 13, and bimetallic strip 31 to a line terminal 14 at one end of the housing 1, while the second contact 12 is electrically connected through a contact carrier 15 thereof, braid 16 to a female stab type line terminal 17 at the other end of the housing 1. The movable contact arm 22 has its upper end in pivotal abutment with the lower end of the manual handle 21 to be operatively connected thereto so that it is movable in response to the manipulation of the manual handle 21 between an ON condition where the first contact 11 is in electrically contacting engagement with the second contact 12, as shown in FIG. 1, and an OFF condition where the first contact 11 is away from the second contact 12 for separation of the contacts, as shown in FIG. 3. The over-center action spring extends between the movable contact arm 22 and a cradle 24 pivotally supported at its end to a cradle pivot 6 in such a way as to have its line of action in the direction of biasing the movable contact arm 22 and therefore the first contact 11 carried thereon into and out of contacting engagement in an over-center manner as the handle 21 is manipulated to be pivoted to its counterclockwise-most ON position and clockwise-most OFF position, respectively.

Figure 4:
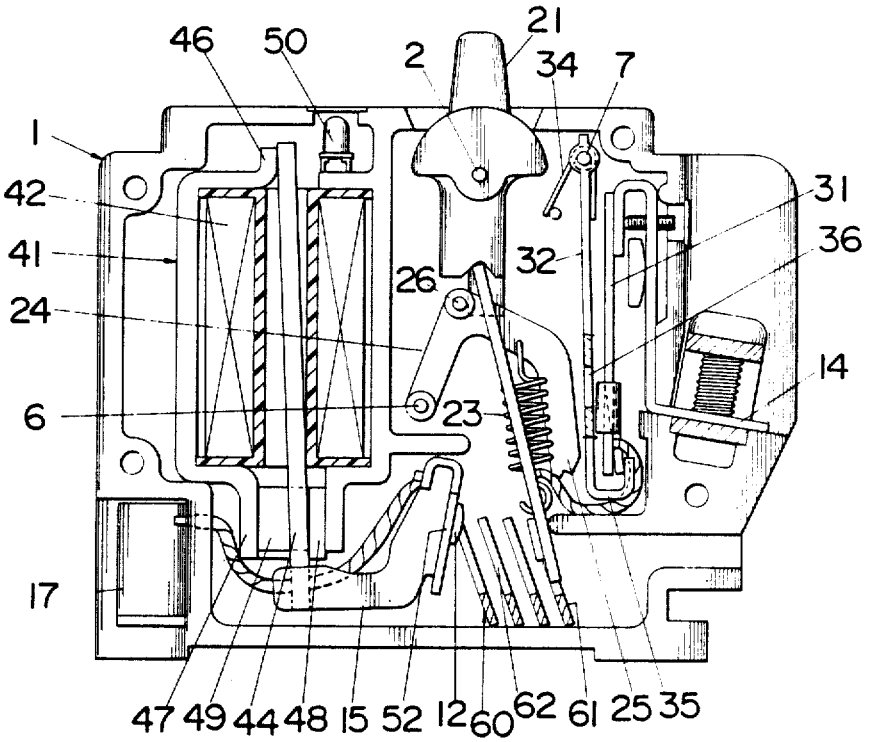
FIG. 4 is a side view of the above circuit breaker with its breaker contacts opened by a trip mechanism actuated in response to overload current conditions.

Also mounted in the compartment 4 of the housing 1 is the trip mechanism 30 which is operatively connected through the cradle 24 to the above manually operable switching mechanism 20 in order to separate the contacts 11 and 12 upon the occurrence of overload current conditions. The trip mechanism 30 is also of conventional arrangement which includes a trip arm 32 and said bimetallic strip 31 with a magnet 33 fixed at a portion thereof. The bimetallic strip 31 is fixed at it upper end to one end of a strap 18 which connects at its other end with a wire-gripping screw 19 of said line terminal 14. The trip arm 32 extends in generally parallel relation to the bimetallic strip 31 and is pivoted at its upper end to a trip axis 7 and is urged by a torsion spring 34 wound about that axis in a clockwise direction as viewed in the figures. The lower end portion of the trip arm 32 is bent upwardly into a U-shade hook 35 engageable with the lower end of the bimetallic strip 31. Formed in the trip arm 32 at intermediate portion thereof is a latch hole 36 in which a latch end 25 of said cradle 24 engages to retain the cradle 24 in position against the biasing force of the over-center action spring 23. Upon occurrence of lesser overload current, the bimetallic strip 31 is resistively heated to deflect the lower end thereof to the right for engagement with the hook 35, thereby causing the trip arm 32 to move in the counterclockwise direction so as to unlatch the cradle 24, with the result of which the cradle 24 is freed to rotate under the urgence of the over-center action spring 23 into a tripped position as shown in FIG. 4 so as to rapidly move the movable contact arm 22 away from the second contact 12 with the over-center action of the spring 23 for quick-break of the contacts. Said magnet 33 fixed to the bimetallic strip 31 is a U-shaped member which surrounds three sides thereof with its legs in facing relation to the trip arm 32 such that, when more severe overcurrent flows through the breaker or the bimetallic strip 31, it is magnetized thereby to attract the trip arm 32, unlatching the cradle 24 in the like manner into the tripped position for separation of the contacts, at which occurrence the manual handle 21 is moved to the intermediate position between the ON indicating position and OFF indicating position, as shown in FIG. 4. Reset of the cradle 24 is made simply by pivoting the handle 21 to its clockwise-most or OFF position, during which operation a reset lever projecting downwardly from the handle 21 pushes a pin 26 on the intermediate portion of the cradle 24 to thereby move the cradle 24 in the counterclockwise direction as the handle 21 rotates to move the movable contact arm 22 into the off condition, allowing the latch end 25 to slide upwardly along the trip arm 32 for latching engagement with the latch hole 36 thereof. In this manner the cradle 24 or the manually operable switching mechanism 20 is restored to its OFF condition, as shown in FIG. 3.

Figure 2:
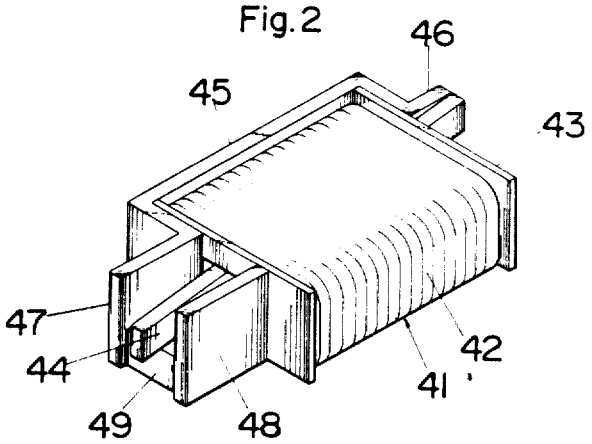
FIG. 2 is a perspective view of a polarized electromagnet employed in the above circuit breaker of FIG. 1.
Figure 5:
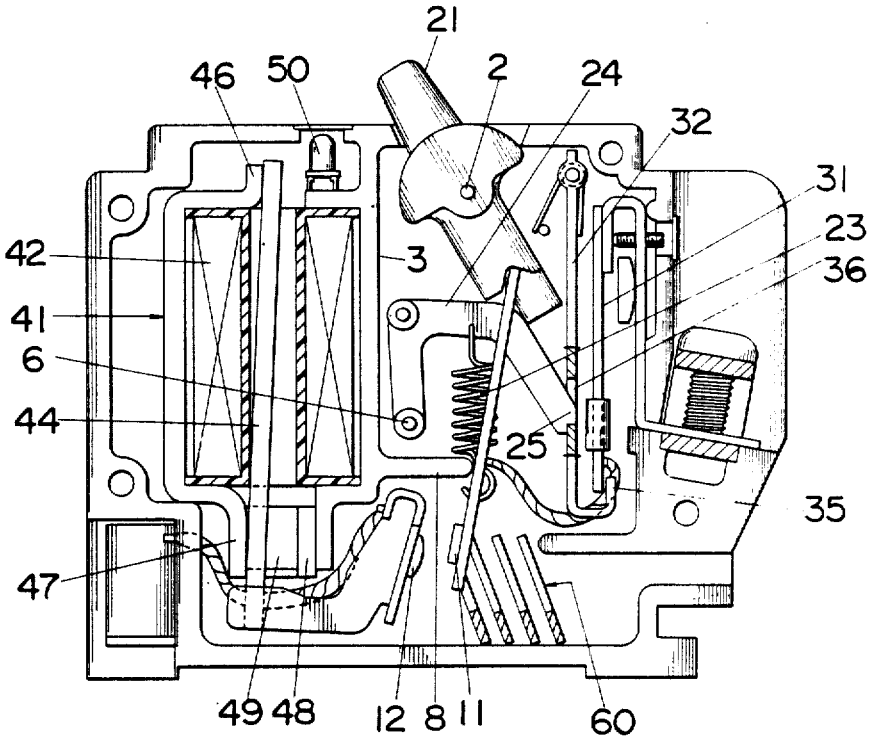
FIG. 5 is a side view of the above circuit breaker with its breaker contacts opened by the electromagnet energized in response to a remote control signal.

Said contact carrier 15 on which the second contact 12 is fixed is operatively connected to the remotely controllable switching mechanism 40 so as to be driven thereby to move between an operative position where it is engageable with the first contact 11 and an inoperative or disable position where it is no longer engageable with the first contact 11 independently of the condition of the manually switching mechanism 20. The remotely controllable switching mechanism 40 is activated in response to the remote control signal and is in the form of a polarized electromagnet 41 to be energized by such remote control signal. In the present embodiment, the electromagnet 41 is of monostable type and comprises, as best shown in FIG. 2, a winding 42 wound around a bobbin 43, an armature 44 extending axially through the bobbin 43, a yoke 45 mounted on one side of the bobbin 43 with flanges 46 and 47 at its both ends extending axially outwardly from the axial ends of the bobbin 43, the flange 46 at the upper end of the bobbin 43 defining a first pole end to which the one end of the armature 44 is pivotally supported and the other flange 47 at the lower end of the bobbin 43 defining a second pole end which is spaced laterally from a pole piece 48 projecting on the lower end of the bobbin 43. A permanent magnet 49 is disposed between the second pole end 47 and the pole piece 48 for magnetizing them in opposite polarity and at the same time interconnecting them in such a manner as to leave therebetween a gap into which the other end or the free end of the armature 44 extends. It is this armature 44 that is connected at its free end to the contact carrier 15 of the second contact 12 for movement thereof between the operative position and inoperative position in response to energization and deenergization of the electromagnet 41. The armature 44 is stable at the position indicated by FIG. 1 where it has its free end attracted by the effect of the permanent magnet 49 to the pole piece 48 so as to complete the magnetic circuit of the magnetic flux emanating from permanent magnet 49 through the pole piece 48, armature 44, first pole end 47, yoke 45, second pole end 47 and returning to permanent magnet 49. In the absence of the remote control signal, the armature 44 is retained at this stable position by the permanent magnet 49, permitting the contacts to be selectively closed and opened by the operation of said manually operable switching mechanism 20. When the electromagnet 41 is energized responsive to the control signal of a given polarity, the free end of the armature 44 becomes magnetized in the same polarity as the pole piece 48 but in the opposite polarity to the second pole end 47 to be thereby attracted thereto, thus moving the second contact 12 away from the first contact 11 into its inoperative position, as shown in FIG. 5. At this occurrence, a stopper projection 8 integral with said partition rib 3 is in abutting engagement with the movable contact arm 22 to prevent it from further rotating in the clockwise direction, thereby keeping the contact separated against the bias of the spring 23. The armature 44 is retained at this position while the electromagnet 41 continues to be energized and upon deenergization of the electromagnet 41 it returns to its stable position due to the magnetic force of the permanent magnet 49, allowing the second contact 12 to resume the operative position.

An indicator lamp 50, which is viewed through a window 9 in the upper wall of the breaker housing 1, is inserted in series circuit with the electromagnet 41 so as to be turned on when the latter is energized for providing a visual indication that the second contact 12 is forcibly separated away from the first contact 11 in response to the remote control signal. This is advantageous in that the user can easily acknowledge the remote control signal responsive operation of separating the contacts and is prevented from being confused so as to uselessly manipulate the handle 13 in an attempt to restore a selective load connected to the breaker.

Mounted in the bottom of the breaker housing 1 is an arc chute 60 which is composed of a stack of U-shaped metal plates 61 slotted to form a passage 62 through which the first contact 11 moves from its closed position to open position. When an arc is drawn between the contacts 11 and 12 upon separation thereof particularly due to short-circuit current conditions, it will produce in the area between the limbs of each metal plate 61 magnetic flux which in turn drives the arc downwardly into the bottom of the arc chute 60, stretching the arc for rapid extinction thereof.

It is noted at this time that said contact carrier 15 is formed at its end with an elongated conductor plate 52 which has on the intermediate portion thereof said second contact 12 and extends in generally parallel relation with the movable contact arm 22 in its ON condition. The conductor plate 52 is electrically connected to the braid 16 at a portion upwardly of the second contact 12 so that it flows the current downwardly therethrough toward the second contact 12, i.e., in the opposite direction to the current flowing upwardly through the movable contact arm 22 from the first contact 11 in contact with the second contact 12, with the result of which there is developed increased electromagnetic forces interacting between the conductor plate 52 and the movable contact arm 22 in such a way as to electromagnetically blow them back in opposite directions upon occurrence of short circuit current or overload current several times the normal rated current flowing through the contacts. Accordingly, the contacts 11 and 12 can be separated by the above electromagnetic blow back effect even before the afore-mentioned trip mechanism 30 is effective to separate the contacts, which effect is further enhanced by adopting the above arrangement of rendering the contact carrier 15 of the second contact 12 to be movable independently of the movable contact arm 22 of the first contact 11.

Figure 6:
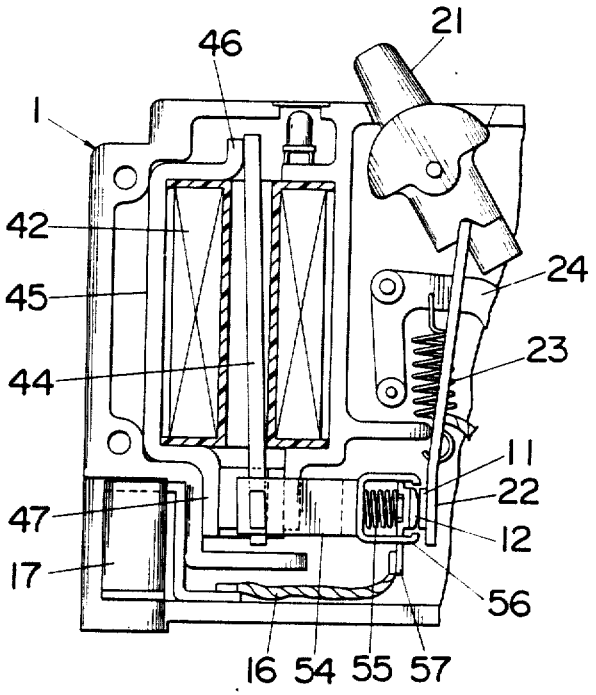
FIG. 6 is a side view, partially broken away, of a modification of the above first embodiment.

Referring to FIG. 6, a modification of the above embodiment is shown which is identical to the above embodiment except that the second contact 12 is supported on a contact carrier 54 by means of a compression spring 55. The contact carrier 54 having its one end connected to the armature 44 is formed at the other end with a bracket 56 to which a conductor plate 57 having thereon the second contact 12 is slidably connected and is urged by the compression spring 55 disposed therebetween in a direction of engaging the second contact 12 with the first contact 11 in its ON condition, for the purpose of providing a suitable contact pressure between the contacts 11 and 12. The compression spring 55 also allows the second contact 12 to be retarded to a some extent when the second contact 12 is struck by the first contact 11 at the time of closing the contacts, thereby serving to reduce contact bounce.

Figure 7:
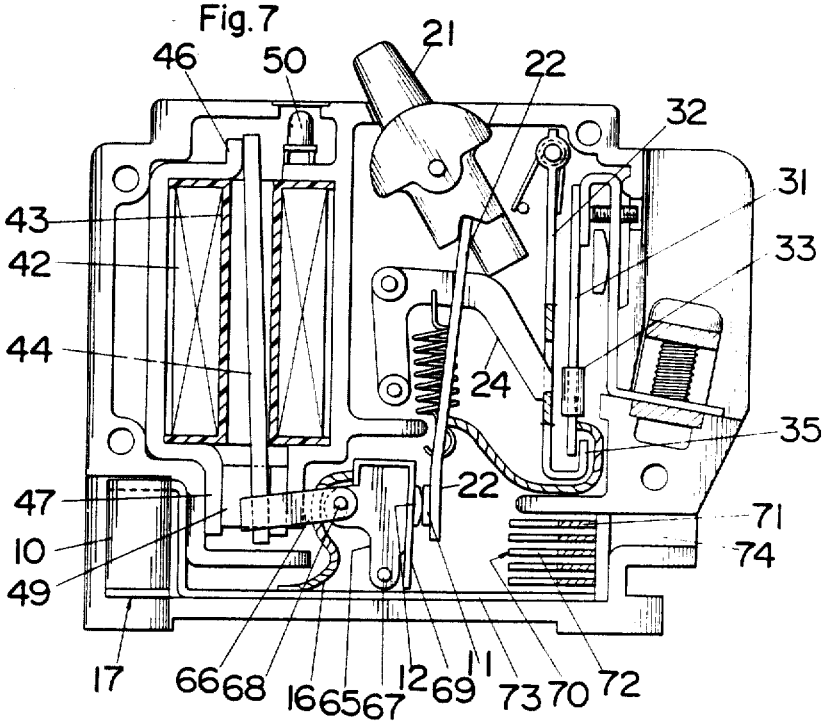
FIG. 7 is a side view of a circuit breaker in accordance with a second preferred embodiment of the present invention.

Second embodiment <FIG. 7>

FIG. 7 shows a second preferred embodiment of the present invention which is similar in construction to the above first embodiment except that the second contact 12 is operatively connected to the armature 44 of the electromagnet 41 through a contact carrier 65 and connecting rod 66. The second contact 12 is fixed on the contact carrier 60 having a first pivot axis 67 by which it is pivoted to the breaker housing 1 for rotation about the first axis 67. The contact carrier 65 also has a second pivot axis 68 to which is pivoted one end of the connecting rod 66 having the other end connected to the armature 44 of the electromagnet 41, so that the contact carrier 65 is driven by reciprocating armature 44 to rotate about the first pivot axis 67 for movement of the second contact 12 between said operative and inoperative positions in response to the deenergization and energization of the electromagnet 41. With this contact carrier 65 pivotally supported to the housing 1, an optimum travel or separation distance of the second contact 12 can be obtained with the limited stroke of the armature 44 of the electromagnet 41.

In this embodiment, there is further disclosed a novel and advantageous feature of an arc chute 70 which is mounted in the bottom of the breaker housing 1 at a location spaced laterally from the second contact 12 but adjacent the first contact 11 in its fully opened condition and which has an added effect to that of the arc chute 60 employed in the first embodiment. The arc chute 70 in the present embodiment comprises a stack of metal plates 71 arranged vertically in face-to-face relation, the first plate of which is in closer relation to the first contact 11 in its fully opened condition and the last plate of which extends along the inner bottom of the housing 1 past the second contact 12 to define an arc runner 73, said arc runner 73 terminating at its end portion outwardly of the housing 1 to form thereat said line terminal 17 with a complementary clip 10 to be electrically charged. The metal plates 71 except the arc runner 73 are U-shaped plates slotted to form a passage 72 for the first contact 11 as it is moves between the ON and OFF conditions. The arc runner 73 is spaced from said contact carrier 65 with a small gap formed therebetween at a portion midway of the arc runner 73 but is electrically connected to the contact carrier 65 by the braid 16 at a point offset toward the line terminal 17 from the portion confronting the contact carrier 65 so as to provide a current path from the line terminal 17 to the second contact 12. The contact carrier 65 is formed with a conductor plate 69 on which the second contact 12 is held and which extends substantially in parallel relation to the movable contact arm 22 in its closed position. The conductor plate 69 is electrically connected to the braid 16 at a point upwardly of the second contact 12 so that, as in the like manner discussed with reference to the first embodiment, the current will flow through the conductor plate 69 in the opposite direction to the current flowing through the movable contact arm 22 so as to produce like electromagnetic force which, in addition to promoting the contact separation upon occurrence of short circuit current, drives the arc drawn between the contacts 11 and 12 downwardly toward the arc runner 73 in response to such short circuit current condition. Whereby the one end of the arc jumps over the gap to be transferred from the lower end of the conductor plate 69 to the arc runner 73 and proceeds therealong toward the stacks of the metal plates 71 as the first contact 11 moves to its fully open position, during which process the arc is drawn deeply into the slot of each U-shaped metal plate 71 for rapid extinction of the arc. With this arrangement, the arc can be immediately transferred from the second contact 12 to the arc runner 73 to effectively avoid pitting of that contact, in addition to being elongated or stretched for facilitating the extinction of the arc. Arcing gases will flow outwardly of the breaker through a vent 74 formed at the lower side of the breaker housing 1 adjacent the arc chute 70.

Third embodiment <FIGS. 8 to 11>

Figure 8:
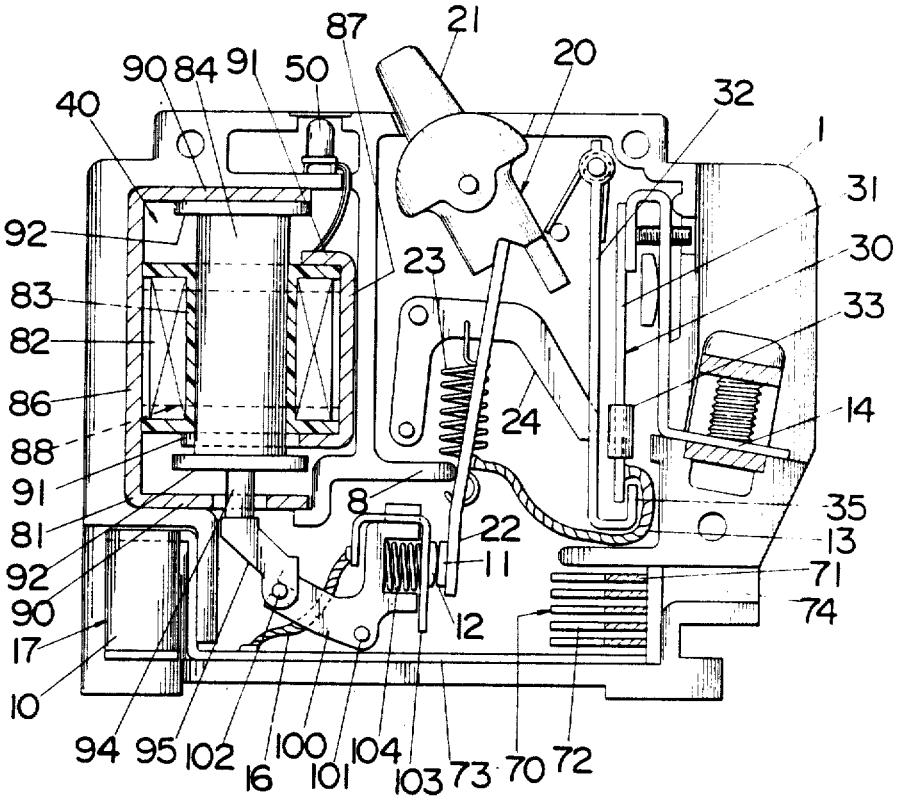
FIG. 8 is a side view of a circuit breaker in accordance with a third preferred embodiment of the present invention and illustrating ON condition in which the breaker contacts are closed.
Figure 9:
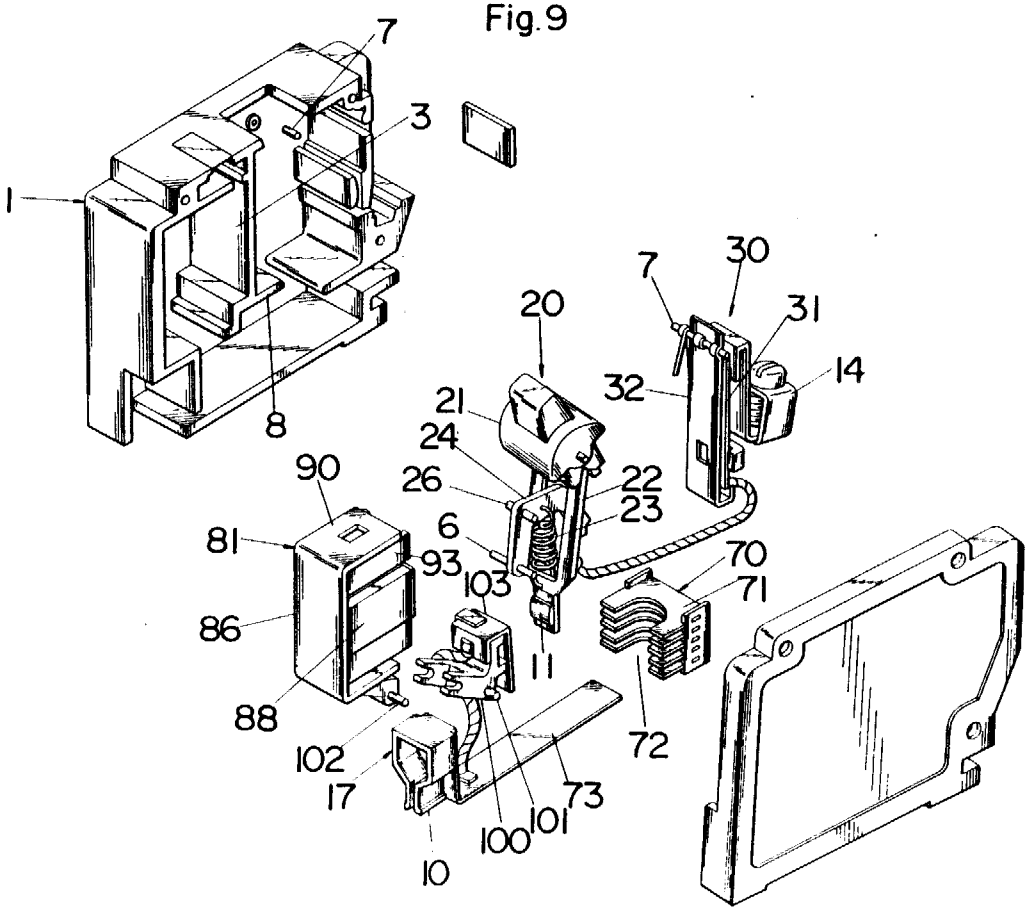
FIG. 9 is an exploded perspective view of the circuit breaker of FIG. 8.
Figure 10:
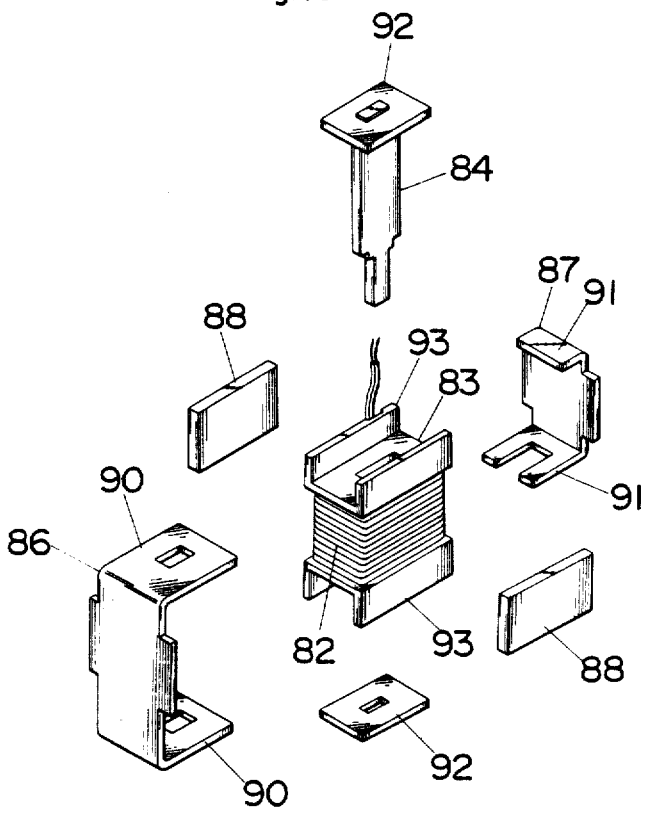
FIG. 10 is an exploded perspective view of a polarized electromagnet employed in the circuit breaker of FIG. 8.

Referring to FIG. 8, there is shown a third preferred embodiment of the present invention which is similar in construction to the first and second embodiments except for the construction of the remotely controllable switching mechanism 40. The manually operable switching mechanism 20 is identical to the first embodiment and therefore is not described in detail so as to avoid duplication of the explanation, while like numerals are employed to designate like parts in the drawings. The remotely controllable switching mechanism 40 is in the form of a polarized electromagnet 81 of monostable operation which, as best shown in FIG. 10, comprises a winding 82 wound around a bobbin 83, an axially movable armature 84 extending axially through the bobbin 83 and connected at its one end to a contact carrier 100 of the second contact 12, first and second yokes 86 and 87 mounted against the opposite sides of the winding 82, and a pair of permanent magnets 88 interposed between the yokes 86 and 87 for magnetizing the same in the opposite polarity. The first and second yokes 86 and 87, each being of U-shaped configuration with a pair of parallel legs connected by a bight or center portion, are assembled into the electromagnet 81 in such a way that the legs of the first yoke 86 extends over the longitudinal ends of armature 84 at positions axially outwardly of the axial ends thereof to define respective outer pole members 90 and the legs of the second yoke 87 extends over the ends of the winding 82 at positions axially inwardly of the adjacent outer pole members 90 to define respective inner pole members 91. The inner pole members 91 are each cooperative with the adjacent outer pole members 90 to form therebetween air gaps within each of which a pole plate 92 at either end of the armature 84 is received so that the armature 84 is axially movable upon energization of deenergization of the electromagnet 81 between two positions at each of which the one of the pole plates 92 is in abutting engagement with the adjacent outer pole member 90. Formed integrally on either end of the bobbin 83 is a channel member 93 which receives on the top of its sidewalls each of the legs or outer pole members 90 of the first yoke 86 to retain it in position and receives on its bottom wall each of said legs or inner pole members 91 of the second yoke 87 to retain it in position.

Said permanent magnets 88 are interposed between the center portions of the first and second yokes 86 and 87 to be secured thereto. Thus, the first and second yokes 86 and 87 are spaced in a direction perpendicular to the axis of the armature 84 by a maximum distance within the width dimension of the electromagnet 81. In other words, the adjacent pairs of inner and outer pole members 90 and 91 can be axially aligned at a vertical distance much shorter than the lateral distance between the first and second yokes 86 and 87, so that the permanent magnets 88 can have their flux concentrated to act over each of the vertical gaps between the outer pole member 90 and the inner pole member 91 without causing substantial leakage thereof acting laterally between the center portions of the first and second yokes 86 and 87. Consequently, the electromagnet 81 of the above construction can be efficiently operated at a lesser power requirement by elimination of ineffective flux leakage of the permanent magnets 88 and at the same time being made compact in size.

Figure 11:
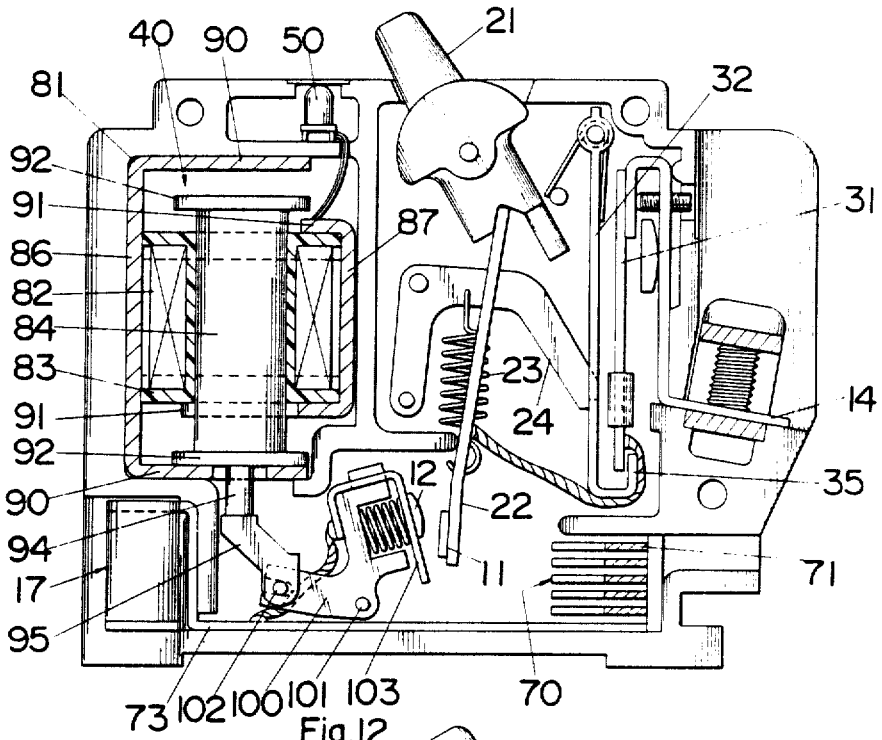
FIG. 11 is a side view of the above circuit breaker with its breaker contacts opened by a polarized electromagnet energized in response to a remote control signal.

One of the inner pole members 91 is dimensioned to be considerably shorter than the other so that the shorter inner pole member 91 is not effective for attracting the adjacent pole plate 92 of the armature 84 to retain the armature 84 in position upon deenergization of the electromagnet 81, whereby the electromagnet 81 is rendered to have monostable operation which allows the armature 84 to be stable only at the position of FIG. 8, where the armature 83 has its upper pole plate 92 in abutting engagement with the adjacent outer pole member 90 and at the same time has its lower pole plate 92 in proximity to the adjacent inner pole member 91 of longer dimension for completing the magnetic circuit of the magnetic flux of the permanent magnets 88. Projecting downwardly from the lower end of the armature 84 is a stud 94 which is connected through a connecting rod 95 to said contact carrier 100 so as to retain the second contact 12 on the contact carrier 100 in the operative position, as shown in FIG. 8, allowing the contact closing and opening when the armature 84 is in the stable position or under a deenergized condition. When the electromagnet 81 is energized by a remote control signal of a given polarity, the armature 84 is driven to move axially downwardly so as to actuate the second contact 12 into the inoperative position, as shown in FIG. 11, where the second contact 12 is moved away from the first contact 11 to disable the contact closing independently of the position of the first contact 11. The above inoperative position is the unstable position so that upon deenergization of the electromagnet 81 the second contact 12 returned to the operative position of FIG. 8.

As in the like manner in the second embodiment of FIG. 7, the contact carrier 100 of the second contact 12 is pivotally supported at a first pivot axis 101 to the breaker housing 1 and is pivotally connected at a second pivot axis 102 to the connecting rod 95 leading to the armature 84 so that contact carrier 100 is driven to rotate about first pivot axis 101 for moving the second contact 12 between the operative and inoperative positions upon deenergization and energization of the electromagnet 81. In this embodiment, the contact carrier 100 is further provided with a slidable contact plate 103 on which the second contact 12 is fixed and which is connected to contact carrier 100 through the like compression spring 104 as in the modification of the first embodiment, which spring 104 being introduced for the same purposes of the above modification and seated in the recess of contact carrier 100.

In addition, the present embodiment also includes like arc chute 70 of the same construction and operational feature as in the second embodiment.

Figure 12:
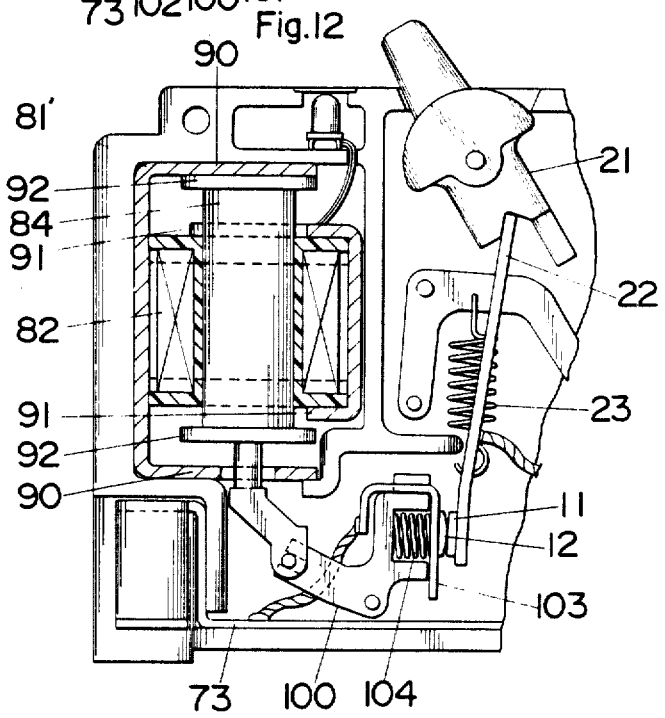
FIG. 12 is a fragmentary side view of a modification of the third embodiment illustrating an ON condition in which the breaker contacts are closed.
Figure 13:
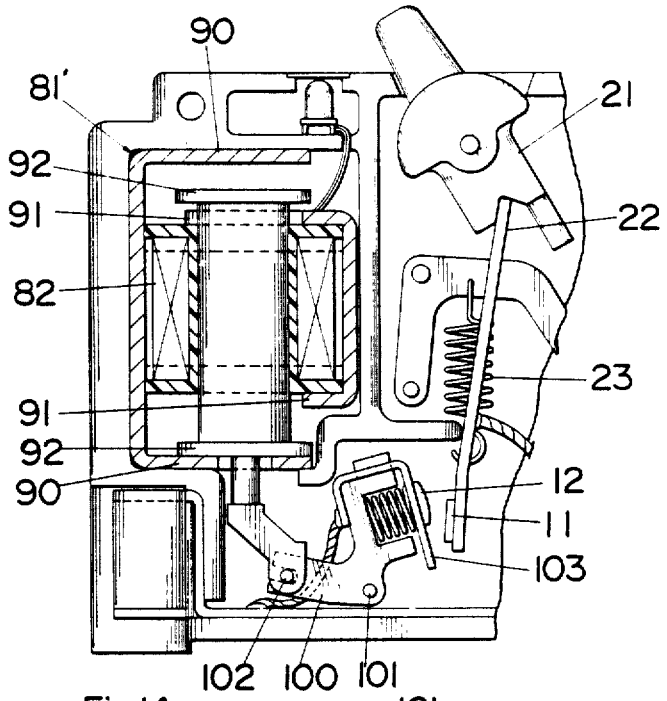
FIG. 13 is a fragmentary side view of a modification of the third embodiment with the breaker contacts opened by the electromagnet.

FIGS. 12 and 13 show a modification of the above third embodiment which is identical to the third embodiment except that the electromagnet 81′ is designed to have the armature 84 stable only when retaining the second contact 12 in its inoperative position, which is in direct contrast to the electromagnet 81 of the third embodiment where the armature 84 is stable when retaining the second contact 12 at its operative position. To this end, one of the inner pole members 91 at the lower end of the winding 82 is made shorter than the other inner pole member 92 such that the lower pole plate 92 of the armature 84 will not be kept attracted upwardly to the adjacent shorter inner pole member 91 after the deenergization of the electromagnet 81′ and instead it is attracted to the adjacent outer pole plate 90 for retaining the second contact 12 at its inoperative position, as shown in FIG. 13. This lasts until the electromagnet 81′ is again energized to move the armature 84 axially upwardly for bringing the second contact 12 into the operative position, as shown in FIG. 12.

Fourth embodiment <FIGS. 14 to 19>

Figure 14:
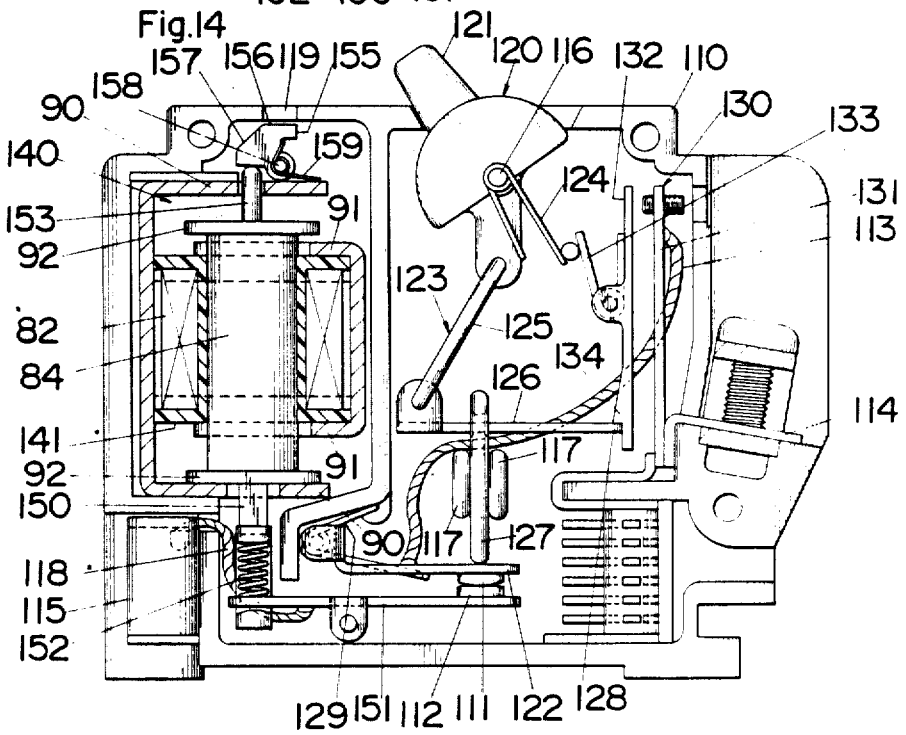
FIG. 14 is a side view of a circuit breaker in accordance with a fourth preferred embodiment of the present invention illustrating an ON condition in which the breaker contacts are closed.

Referring to FIG. 14, there is shown a fourth embodiment of the present invention. The circuit breaker of the present embodiment comprises a combination of manually operable switching mechanism 120 and trip mechanism 130 of different types from those of the previous embodiments and includes a polarized electromagnet 141 of bistable operation as the remotely controllable switching mechanism 140. The manually operable switching mechanism 120 is responsible for closing and opening a single set of first and second contacts 111 and 112 in delayed-make and quick-break fashion and comprises a manual handle 121 operatively connected to a movable contact arm 122 carrying the first contact 111 through a linkage 123.

Included in said trip mechanism 130 is a trip arm 132 pivoted at its center to a breaker housing 110 and is urged by a torsion spring 133 in a clockwise direction as viewed in the figures and bimetallic strip 131 which is mechanically and electrically connected at its end to a line terminal 114 and is electrically connected to a movable contact arm 122 carrying the first contact 111 by a flexible braid 113. The manual handle 121 is pivoted at a handle pivot 116 to the breaker housing 110 and is urged by a torsion spring 124 in the clockwise direction, or into an OFF position. Said linkage 123 comprises a link 125 with one end pivoted to the manual handle 121 and with the other end pivoted to one end of a leaper plate 126 which is engageable at its other end with a latch projection 134 at the lower end of the trip arm 132. The leaper plate 126 extends through the upper portion of a joint member 127 of insulative material and is fulcrumed at its intermediate portion against the joint member 127, said leaper plate 126 having at the other end adjacent the trip arm 122 a latch end 128 engageable with the latch projection 134. The joint member 127, which is vertically movable between a pair of parallel ribs 117 on the inner wall of the breaker housing 110, has its lower end in abutting engagement with the end of the movable contact arm 122 remote from its pivoted end and is biased upwardly together with the movable contact arm 122 by a torsion spring 129 acting upon the movable contact arm 122.

Figure 17:
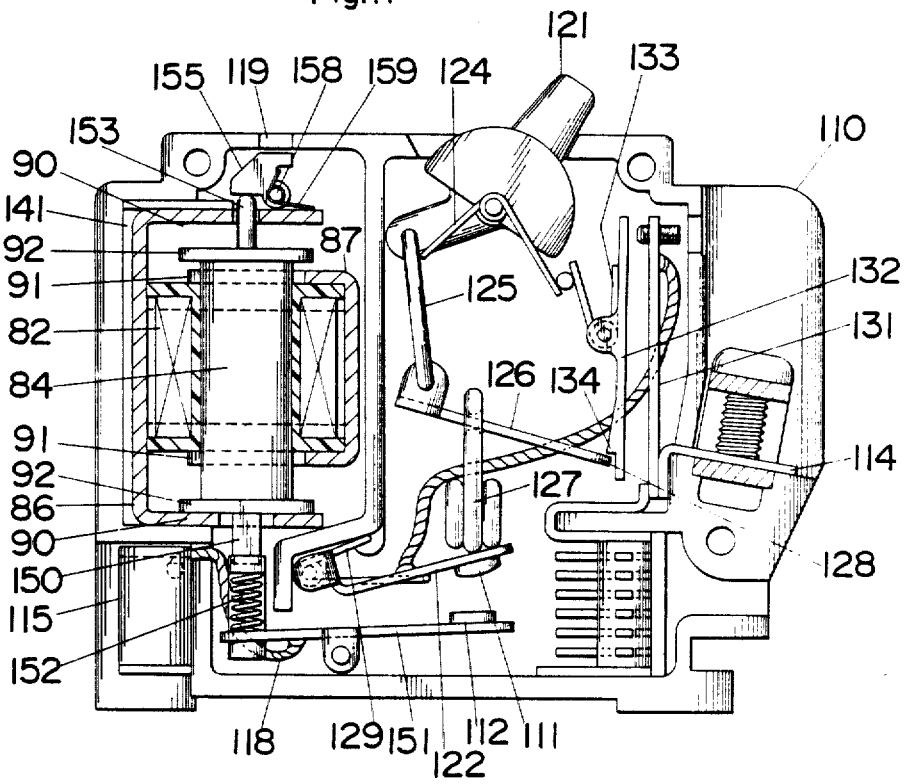
FIG. 17 is a side view of the above circuit breaker illustrating an OFF condition in which the breaker contacts are opened by the manipulation of the manual handle.

In operation, when the manual handle 121 is moved to its counterclockwise-most position or ON position, as shown in FIG. 14, said linkage 123 acts to gradually push down the movable contact arm 122 against the bias of the torsion spring 129 for bringing the first contact 111 into contacting engagement with the second contact 112 in delayed-make fashion, by keeping the latch end 128 of the leaper plate 126 engaged with the latch projection 134, at which condition the link 125 applies its line of action to the manual handle 121 for continuously urging the manual handle 121 against the wall of the breaker housing 110 in the counterclockwise direction, thus retaining the manual handle 121 at its ON position. When on the other hand, the manual handle 121 is manipulated to its clockwise-most position or OFF position, as shown in FIG. 17, the link 125 no more applies downward force to the one end of the leaper plate 126, which responds by moving upwardly due to the bias of the spring 129 with its latch end 128 kept engaged with the latch projection 134 of the trip arm 122, thus allowing the joint member 127 and the movable contact arm 122 to move upwardly for separation of the contacts, at this condition the manual handle 121 receives the line of action of the link 125 to be thereby urged in the clockwise direction against the wall of the housing 110 so as to be retained at this position.

Figure 18:
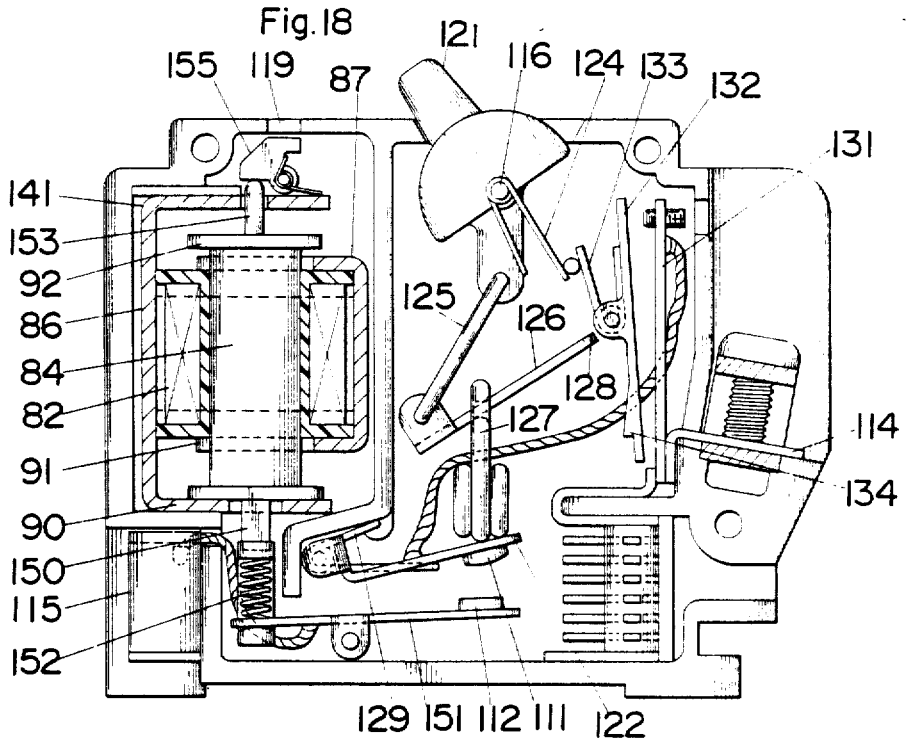
FIG. 18 is a side view of the above circuit breaker with its breaker contact opened by a trip mechanism actuated in response to overload current conditions.

In the event of overload currents flowing through the breaker, the bimetallic strip 131 is resistively heated to deflect its upper end so as to drive the trip arm 132 in the counterclockwise direction to thereby unlatch the leaper plate 126, at which moment, the leaper plate 126 responds to jump upwardly together with the joint member 127 and the movable contact arm 122 for rapid separation of the contacts 111 and 112, as shown in FIG. 18. After the trip mechanism 130 acts to release the contacts, the spring 129 no longer applies its urging force to the manual handle 121 at the condition of FIG. 18, whereby the handle 121 is allowed to move back to its clockwise-most position or OFF position by the bias of the spring 124 lifting up the pivot end of the leaper plate 126 to rotate it in the clockwise direction until the latch end 128 is again engaged with the latch projection 134 of the trip arm 132. In this manner, the movable switching mechanism 120 is returned to the OFF position of FIG. 17.

Said polarized electromagnet 141 employed as the remotely controllable switching mechanism 140 is of bistable construction and thus the second contact 112 is operatively connected to the electromagnet 141 to be rendered stable both at its operative and inoperative positions. The electromagnet 141 is identical in construction to that of the previously described third embodiment except that the inner pole members 91 of the second yoke 87 are designed to have the same dimensions, and therefore like numerals are employed to designate like parts. With the arrangement of incorporating the identical inner pole members 91 in the electromagnet 141 of the present embodiment, the armature 84 is movable between two stable positions at each of which the armature 84 has its upper and lower pole plates 92 attracted to the adjacent outer pole member 90 and the inner pole member 91 to complete the magnetic circuit of the permanent magnet flux. Thus, the second contact 112 operatively connected to the armature 84 can be held at both of the operative and inoperative positions without continued energization of the electromagnet 141. Projecting on the lower pole plate 92 of the armature 84 is a stud 150 which extends downwardly through the outer pole member 90 for connection with one end of a contact carrier 151, said contact carrier 151 being pivoted at its center to the breaker housing 110 and provided at the other end with said second contact 112, said contact carrier 151 being electrically connected through a braid 118 to a line terminal 115. A compression spring 152 is interposed between the stud 150 and the contact carrier 151 for the purpose of providing an optimum contact pressure between the contacts as well as shock absorbing action at the time of contact closing, as in the previous embodiment of FIG. 8.

Figure 15:
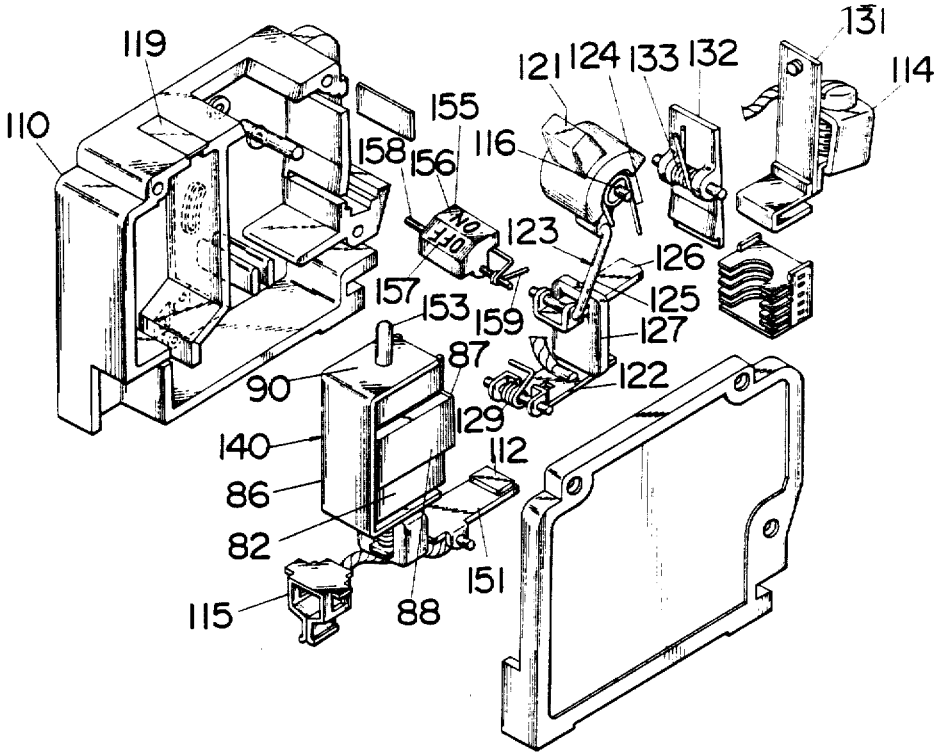
FIG. 15 is an exploded perspective view of the circuit breaker of FIG. 14.
Figure 16:
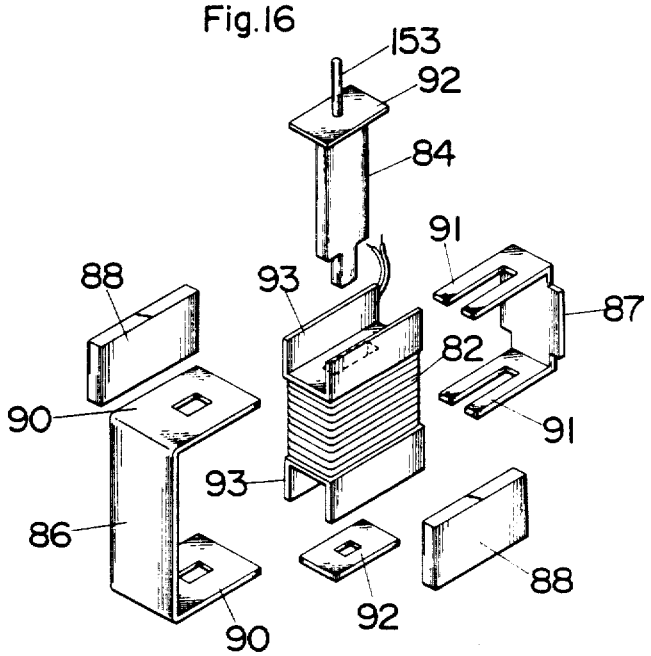
FIG. 16 is an exploded perspective view of an electromagnet employed in the above circuit breaker of FIG. 14.
Figure 19:
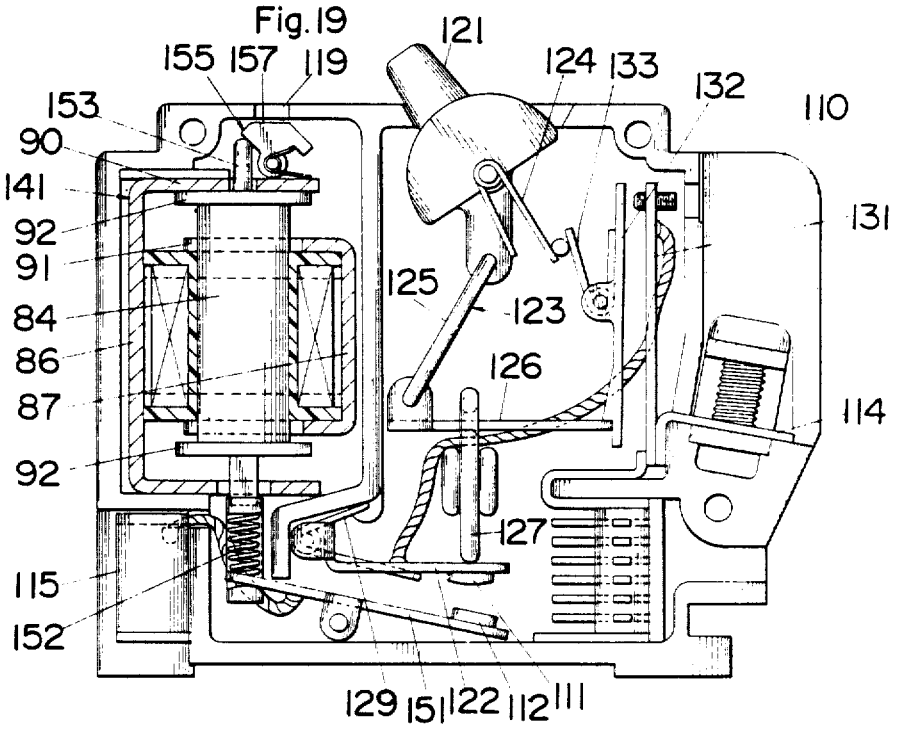
FIG. 19 is a side view of the above circuit breaker with its breaker contacts opened by the electromagnet energized in response to a remote control signal.

Projecting on the upper pole plate 92 of the armature 84 is a plunger 153 which extends through the outer pole member 90 to be engaged with an indicator 155 for actuation thereof. As best shown in FIG. 15, the indicator 155 has two angularly displaced segments 156 and 157, one marked with "ON" indication and the other with "OFF" indication. The indicator 155 is pivotally supported on a horizontal axis 158 to be rotatable thereabout and is urged by a torsion spring 159 in one direction, i.e., the clockwise direction as viewed in the figures. Said plunger 153 is in such a relation with the indicator 155 that when the armature 84 moves upwardly to bring the second contact 112 into its inoperative position, the plunger 153 pushes the indicator 155 against the bias of the spring 159 to rotate the same into a position where the "OFF" indication on the indicator 155 can be viewed through a window 119 in the upper wall of the breaker housing 10 as shown in FIG. 19, by which indication the user near the breaker can acknowledge that the breaker is under remote operation responsive to the control signal for moving the second contact 112 into its inoperative position or condition of disabling the contact closing. When the armature 84 is driven to move downwardly together with the plunger 153 for moving the second contact 112 into its operative position capable of bringing the second contact 112 into and out of contacting engagement with the first contact 111, as shown in FIGS. 14, 17 and 18, the indicator 155 rotates correspondingly in the opposite direction under the influence of the spring 159 into the position where the "ON" indication can be viewed through the window 119 for visual indication of such condition. It is to be noted at this point that when the second contact 112 is actuated by the electromagnet 141 to move into the inoperative position, the movable contact arm 122 carrying the first contact 11 is blocked by the spring 129 from moving towards the second contact 112 so as to be kept apart from the second contact 112 by a suitable distance.

What is claimed is:

[1. A remotely controllable circuit breaker comprising in combination:

a single set of first and second contacts;

a manually operable switching mechanism for opening and closing the contacts, said manual switching mechanism including a manual handle movable between an ON position and OFF position and including a movable arm carrying the first contact which arm is operatively connected to the manual handle to be actuated thereby between an ON condition and an OFF condition for bringing the first contact into and out of contacting engagement with the second contact;

a trip mechanism operatively connected to the manually operable switching mechanism so as to open the contacts upon the occurrence of predetermined fault current conditions flowing through the breaker;

a remotely controllable switching mechanism for forcibly opening and closing the contacts in response to a remote control signal;

said second contact being movable between an operative position where it is in electrical contacting engagement with the first contact of the movable arm in the ON condition and an inoperative position where it is away from the first contact independently of the conditions of the movable contact arm; and said second contact being operatively connected to said remotely controllable switching mechanism in such a way as to be moved from between the operative and the inoperative positions by the latter receiving the remote control signal.]

[2. A remotely controllable circuit breaker as set forth in claim 1, wherein said remotely controllable switching mechanism is a polarized electromagnetic with permanent magnet means and an armature operatively connected to said second contact for movement thereof, said permanent magnet means attracting the armature in the direction of moving the second contact to its operative position, and said electromagnet being connected to be energized responsive to the remote control signal for actuating the armature in the direction of moving the second contact to its inoperative position upon magnetizing the armature to having the flux thereof opposing and overpowering the magnetic flux of the permanent magnet means.]

3. A remotely controllable circuit breaker [as set forth in claim 2], *comprising in combination:*

*a single set of first and second contacts;*

*a manually operable switching mechanism for opening and closing the contacts, said manual switching mechanism including a manual handle movable between an ON position and OFF position and including a movable arm carrying the first contact which arm is operatively connected to the manual handle to be actuated thereby between an ON condition and an OFF condition for bringing the first contact into and out of an operative position for electrical contacting engagement with the second contact;*

*a trip mechanism operatively connected to the manually operable switching mechanism so as to open the contacts upon the occurrence of predetermined fault current conditions flowing through the breaker;*

*a remotely controllable switching mechanism for driving the second contact to forcibly open the contacts in response to a remote control signal;*

*said second contact being movable between the operative position where it is in a position for electrical contacting engagement with the first contact of the movable arm in the ON condition and an inoperative position where the second contact is away from said operative position; means for prohibiting the first contact from contacting the second contact when said second contact is away from said operative position independently of the manipulation of the manual switching mechanism; and*

*said second contact being operatively connected to said remotely controllable switching mechanism in such a way as to be movable from the operative to the inoperative positions by the remotely controllable switching mechanism receiving the remote control signal;* wherein said *remotely controllable switching mechanism is a* polarized electromagnet [is] of monostable type [which allows the armature to be stable only at the position of keeping the second contact at its operative position so that the armature is attracted by the permanent magnet to move the second contact into the operative position upon deenergization of the electromagnet] *with permanent magnet means and an armature operatively connected to said second contact for movement thereof, said permanent magnet means attracting the armature in the direction of moving the second contact to its operative position and keeping the second contact at its operative position upon the deenergization of the electromagnet, and said electromagnet being connected to be energized responsive to the remote control signal for actuating the armature in the direction of moving the second contact into its operative position upon magnetizing the armature to have the flux of opposing and overpowering the magnetic flux of the permanent magnet means.*

[4. A remotely controllable circuit breaker as set forth in claim 2, wherein said polarized electromagnetic is of monostable type which allows the armature to be stable only at the position of keeping the second contact at its inoperative position so that the armature is attracted by the permanent magnet to move the second contact into the inoperative position upon deenergization of the electromagnet.]

5. A remotely controllable circuit breaker [as set forth in claim 2], *comprising in combination:*

*a single set of first and second contacts;* a manually operable switching mechanism for opening and closing the contacts, said manual switching mechanism including a manual handle movable between an ON position and OFF position and including a movable arm carrying the first contact which arm is operatively connected to the manual handle to be actuated thereby between an ON condition and an OFF condition for bringing the first contact into and out of an operative position for electrical contacting engagement with the second contact;

*a trip mechanism operatively connected to the manually operable switching mechanism so as to open the contacts upon the occurrence of predetermined fault current conditions flowing through the breaker;*

*a remotely controllable switching mechanism for driving the second contact to forcibly open the contacts in response to a remote control signal;*

*said second contact being movable between the operative position where it is in a position for electrical contacting engagement with the first contact of the movable arm in the ON condition and an inoperative position where the second contact is away from said operative position; means for prohibiting the first contact from contacting the second contact when said second contact is away from said operative position independently of the manipulation of the manual switching mechanism; and*

*said second contact being operatively connected to said remotely controllable switching mechanism in such a way as to be movable from the operative to the inoperative positions by the remotely controllable switching mechanism receiving the remote control signal;* wherein said *remotely controllable switching mechanism is a* polarized electromagnet [is] of bistable type [which allows the armature to be stable both at the positions of keeping the second contact at the operative position and at the inoperative position] *with permanent magnet means and an armature operatively connected to said second contact for movement thereof, said permanent magnet means keeping the armature and the second contact in both of its operative and inoperative positions, and said electromagnet being connected to be energized responsive to the remote control signal for actuating the armature in the direction of moving the second contact selectively into its inoperative position and its operative position upon magnetizing the armature to have the flux of opposing and overpowering the magnetic flux of the permanent magnet means.*

6. A remotely controllable circuit breaker [as set forth in claim 2], *comprising in combination:*

*a single set of first and second contacts;* a manually operable switching mechanism for opening and closing the contacts, said manual switching mechanism including a manual handle movable between an ON position and OFF position and including a movable arm carrying the first contact which arm is operatively connected to the manual handle to be actuated thereby between an ON condition and an OFF condition for bringing the first contact into and out of an operative position for electrical contacting engagement with the second contact;

a trip mechanism operatively connected to the manually operable switching mechanism so as to open the contacts upon the occurrence of predetermined fault current conditions flowing through the breaker;

*a remotely controllable switching mechanism for forcibly opening and closing the contacts in response to a remote control signal;*

*said second contact being movable between an operative position where it is in a position for electrical contacting engagement with the first contact of the movable arm in the ON condition and an inoperative position where it is prohibited from being engaged with the first contact independently of the manipulation of the manual switching mechanism;*

*said second contact being operatively connected to said remotely controllable switching mechanism in such a way as to be movable between the operative to the inoperative positions by the latter receiving the remote control signal;* [*wherein*] *said polarized electromagnet includes the armature which is axially movable and operatively connected to said second contact for movement thereof between the operative and inoperative positions, a winding surrounding the armature, first and second U-shaped yokes mounted against the opposite sides of the winding with the central portion of each yoke in parallel relation with the length of the armature, and the permanent magnet means disposed between the center portions of the first and second yokes to polarize them in opposite polarity*[,]*;* the legs of the first yoke extending over the longitudinal ends of the armature at positions axially outwardly thereof to define individual outer pole members[,];

the legs of the second yoke extending over the longitudinal ends of the winding at positions axially outwardly thereof but inwardly of said outer pole members to define individual inner pole members which are cooperative with the adjacent outer pole pieces to form therebetween respective air gaps within which the longitudinal ends of the armature are positioned, whereby the armature is driven to move in a direction of overlaying the permanent magnet flux and the excitation flux upon energization of the winding and is kept in at least one stable position upon deenergization of the winding at which stable position the armature completes the magnetic flux path of the permanent magnet means with the longitudinal ends thereof in close proximity relation to the adjacent outer and inner pole members, respectively.

7. A remotely controllable circuit breaker as set forth in [claim 1] *either claim 3 or 5*, wherein said manually operative switching mechanism includes an over-center action spring which effects opening and closing of the contacts in quick-break, quick-make fashion.

8. A remotely controllable circuit breaker as set forth in [claim 1] *either claim 3 or 5*, wherein said manually operable switching mechanism includes a linkage interconnecting the movable handle and the movable contact arm, a biasing spring for biasing the linkage in the direction of moving the movable contact arm into the OFF condition and permitting it to effect closing of the contacts in delayed-make fashion in response to manipulation of the manual handle, and latch means connecting the linkage to said trip mechanism such that it retains linkage to hold the movable contact arm at its ON condition against the force of the biasing spring when the linkage is manipulated by the manual handle to move the movable contact arm into such condition and that it unlatches the linkage upon the actuation of the trip mechanism to release the movable contact arm from the ON condition to the OFF condition in quick-break fashion by the action of the biasing spring.

9. A remotely controllable circuit breaker as set forth in [claim 1] *either claim 3 or 5*, wherein said second contact is held on a contact carrier having a first pivot axis for rotation thereabout and a second pivot axis connected to the output of the remotely controllable switching mechanism so that the contact carrier is driven thereby to move the second contact between the operative and inoperative positions along a circular path about the first pivot axis.

10. A remotely controllable circuit breaker as set forth in [claim 1] *either claim 3 or 5*, wherein said second contact is held on a compression spring by means of which it is connected to the remotely controllable switching mechanism.

11. A remotely controllable circuit breaker as set forth in [claim 1] *either claim 3 or 5*, including a contact plate carrying said second contact and extending in generally parallel relation with the movable contact arm carrying the first contact in its ON condition for conducting an electric current therethrough in a direction opposite to the current flowing through the movable contact arm in order to produce an electromagnetic force in the vicinity of the contacts, said electromagnetic force being applied to a possible arc drawn between the contacts upon separation thereof for transferring the arc away from the contacts, and including an arc chute disposed within a housing of the circuit breaker at a location near the first contact of the movable contact arm in its OFF condition, said arc chute comprising a stack of spaced metal plates the first plate of which is in close proximity to the first contact of the movable contact arm in its fully open condition and the last plate of which is remote from the movable contact arm and extends substantially along the sweep of the first contact beyond the second contact to define itself an arc runner, said arc runner having its intermediate portion in close proximity to the end of the contact plate and being electrically connected thereto at its end portion remote from the arc chute such that upon separation of the contacts one end of said arc is transferred from the contact plate to the arc runner due to said electromagnetic force and is guided along the arc runner into said arc chute as the movable contact arm moves towards OFF position for extinction of the arc.

12. A remotely controllable circuit breaker as set forth in [claim 1] *either claim 3 or 5*, wherein said breaker is provided with an indicator which is responsive to the remote control signal for providing a visible indication of the actuation of said remotely controllable switching mechanism.

*13. A remotely controllable circuit breaker as set forth in either claim 3 or 5, including means comprising a mechanical stop preventing said contact from following the path of movement of the second contact from its operative to its inoperative position.*

* * * * *